United States Patent [19]

Ellis

[11] Patent Number: 4,593,566

[45] Date of Patent: Jun. 10, 1986

[54] VIBRATION MONITORING IN ROTARY MACHINES

[75] Inventor: Victor E. H. Ellis, Bristol, England

[73] Assignee: Rolls Royce Limited, London, England

[21] Appl. No.: 628,281

[22] Filed: Jul. 6, 1984

[30] Foreign Application Priority Data

Jul. 8, 1983 [GB] United Kingdom ................. 8318509

[51] Int. Cl.[4] ............................................. G01N 29/00
[52] U.S. Cl. ...................................................... 73/660
[58] Field of Search .................................. 73/593, 660

[56] References Cited

U.S. PATENT DOCUMENTS

| 3,289,073 | 11/1966 | Loeffler | 73/660 |
| 3,597,963 | 8/1971 | Smejkal | 73/660 |
| 3,654,803 | 4/1972 | Robinson | 73/660 |

FOREIGN PATENT DOCUMENTS

1353732  5/1974  United Kingdom .

OTHER PUBLICATIONS

"Noninterference Technique for Measurement of Turbine Engine Compressor Blade Stress", *J. Aircraft*, vol. 19, No. 1, Jan. 1982, pp. 65-70.

"Performance Evaluation of a Prototype Noninterference Technique for Measurement of Turbine Engine Compressor Blade Stress", *Arnold Engineering Development Center*, Oct. 1980.

*Primary Examiner*—Anthony V. Ciarlante
*Attorney, Agent, or Firm*—Parkhurst & Oliff

[57] ABSTRACT

A rotary bladed machine (10) is provided with two probes (16,17) which provide output signals upon the passage past them of the tips (15) of an annular array of rotor blades (14) mounted within the machine (10). Electrical circuitry associated with the probes (16,17) incorporates a ramp generator (29) which provides steadily increasing and decreasing voltages as the blade tips (15) successively pass the probes (16,17). The ramp generator (29) voltage is sampled at regular intervals, the circumferential spacing of the probes (16,17) and the rates of the ramp generator (29) voltage change being chosen such that the sample voltage is zero in the event of the spacings between the blade tips (15) having a predetermined value but is not zero in the event that those spacings depart from the predetermined value. The sampled voltage is a function of the amplitude and frequency of vibration of the disc (13) carrying the blades (14).

8 Claims, 7 Drawing Figures

VIBRATION MONITORING IN ROTARY MACHINES

BACKGROUND OF THE INVENTION

This invention relates to the monitoring of vibration in rotary machines, and is particularly useful in monitoring vibration of bladed rotors such as found in compressors and turbines for gas turbine engines.

Vibration in rotary bladed machines, for instance compressors or turbines, is either tied or not tied to machine rotation. Non-tied vibration can be monitored by the use of a suitable detector probe mounted on the casing which normally surrounds the rotor blades. This is both simple and inexpensive to install on a machine and is effective in providing an indication of vibration in the rotating blades. Such detector probes are not effective, however, in the monitoring of vibration which is tied to machine rotation. This is because if a single blade on a rotating annular array of rotary blades is considered, that blade will always appear in the same vibrational position as it passes the probe detector. This is in contrast to non-tied vibration in which the blade appears in a position different to that which it occupied on its previous passage past the probe detector.

Tied vibration is conventionally monitored by the use of strain gauges or F.M. grids. In these methods, the strain gauges or F.M. grid magnets are actually located on the rotary parts of the machine. This being so, they are frequently difficult to install, and also tend to be expensive.

SUMMARY OF THE INVENTION

According to the present invention, a rotary machine comprises:

a rotor;

a plurality of rotor elements circumferentially spaced around the rotor at generally equal spacings;

at least two probes mounted close to the path of portions of said elements which are subject to vibrational motion, the probes being circumferentially spaced from each other by a spacing which is non-integral with the spacing of the elements;

an electrical circuit connected to receive the outputs of the probes, and comprising:

first means providing an output which can change progressively in either of two opposite senses at predetermined rates;

triggering means for causing the output of said first means to commence changing in a first said sense on passage of a said element portion past a first said probe, and subsequently to commence changing in the second said sense on passage of a said element portion past a second said probe; and output means, which registers the output of the first means on passage of a said element portion past one of the probes, whereby the output from the output means is indicative of vibration of said element portions.

BRIEF DESCRIPTION OF THE DRAWINGS

The invention will now be described, by way of example, with reference to the accompanying drawings in which.

DESCRIPTION OF THE PREFERRED EMBODIMENTS

Figure 1:
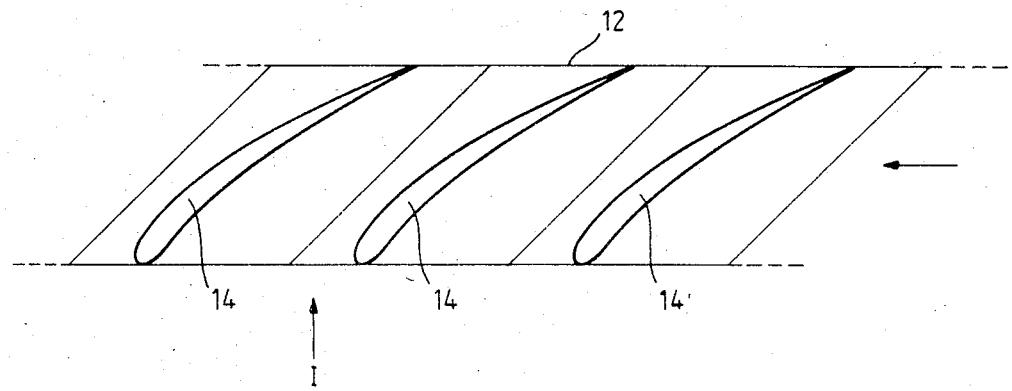
FIG. 1 is a side view of a part of a bladed rotor of a rotary bladed machine in accordance with the present invention.
Figure 2:
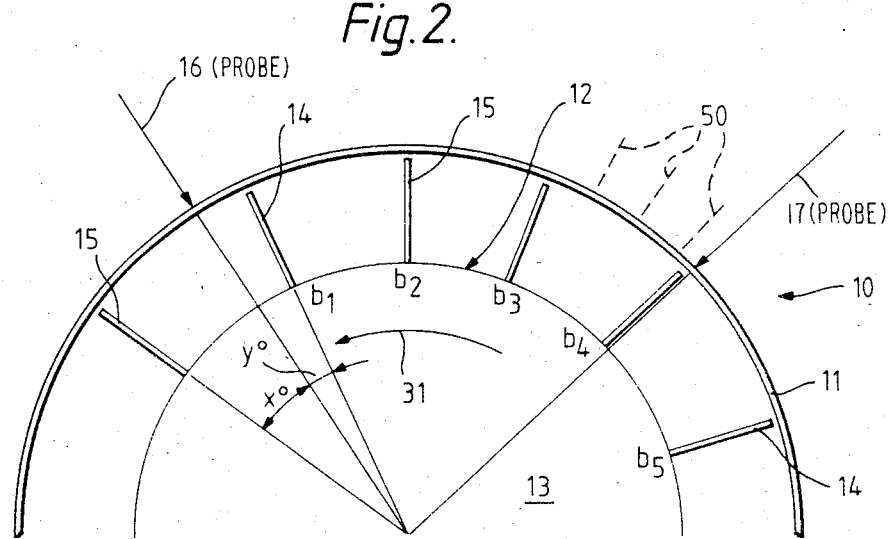
FIG. 2 is a view on arrow I of the bladed rotor shown in FIG. 1 and which additionally depicts a casing surrounding the bladed rotor.

With reference to FIGS. 1 and 2, a rotary bladed machine 10 comprises a casing 11 which encloses a bladed rotor 12. The bladed rotor 12 in turn comprises a rotor disc 13 which carries an annular array of generally equally spaced apart rotor aerofoil blades 14. The rotary bladed machine 10 could constitute a portion of the compressor or turbine of a gas turbine propulsion engine.

The rotor aerofoil blades 14, as can be seen from FIG. 1, lie within but are acutely angled with respect to the plane of rotation of the rotor disc 13. Moreover their tips 15 are arranged so as to pass as closely as possible to the radially inner surface of the casing 11 in order to minimize gas leakage between the blades 14 and the casing 11.

Figure 3:
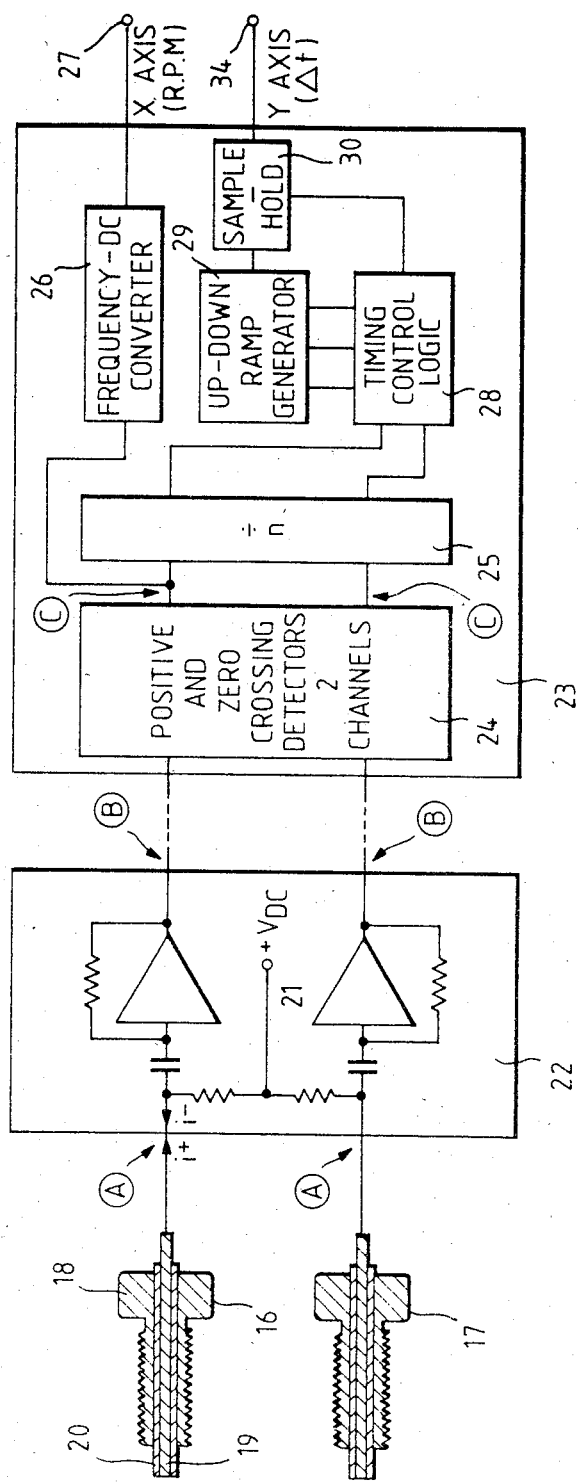
FIG. 3 is a diagram of a circuit and its associated probes for monitoring vibration in the disc of the bladed rotor shown in FIGS. 1 and 2.

The casing 11 carries two probes 16 and 17 which are shown in diagrammatic form in FIG. 2 although their actual form can be seen in FIG. 3. The probes 16 and 17 are of identical construction, comprising a bolt 18 which locates in a corresponding tapped hole in the casing 11 and an electrode 19 which is located coaxially within the bolt 18. An insulator 20 sheaths the electrode 19 to isolate it from the bolt 18. The probes are mounted on the casing 11 so that the electrodes 19 are positioned as closely as possible to the tips 15 of the blades 14. In order to ensure that none of the blades 14 are damaged in the event of a blade tip 15 contacting an electrode 19, the electrodes 19 are formed from a graphite based material. It will be appreciated, however, that other conductive abradable materials could be used instead of the graphite based material if so desired.

Figure 4:
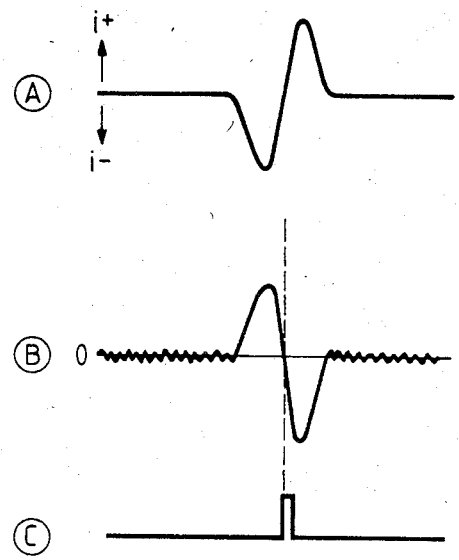
FIG. 4 indicates the forms of electrical signals at various positions within the circuit shown in FIG. 3.

The electrodes 19 of the probes 16 and 17, are polarized by a dc voltage source 21. Polarization of the electrodes 19 ensures that as each blade tip 15 passes each electrode 19, there is a capacitance change in the capacitor which is defined by the electrode 19 and blade tip 15. This in turn results in small currents i flowing into and out of the thus defined capacitors. The currents i produce well defined zero-crossover signals at positions A as can be seen in FIG. 4. These signals are conditioned by a head amplifier 22 to provide signals at positions B as can be seen in FIG. 4 which are suitable to drive long lengths of cable to a signal analyser 23. The signal analyser 23 further conditions the signals by passing them through two threshold detectors 24. The first, a variable positive level comparator gates a second, close-to-zero level comparator. This allows precise timing through the zero crossing when the signal-noise ratio is high but inhibits the zero crossing comparator during periods when a blade tip 15 is not adjacent an electrode 19 and the signal-noise ratio is zero.

The signals which emerge from the threshold detectors at C are shown in FIG. 4. One output from the threshold detectors 24 is connected to a frequency-dc convertor 26 to provide in turn an output 27 which is indicative of the rotational speed of the bladed rotor 12. The signals from the detectors 24 are fed into a divider 25 which samples every twenty sixth blade passing signal (twenty six being the number of blades 14 which are mounted on the rotor 13). Thus the output of the divider 25 always refers to the same blade/probe combination upon each revolution of the bladed rotor 12.

The outputs from the divider 25 are fed into a timing control logic 28 which in turn has outputs which feed an up-down ramp generator 29 and a sample-hold circuit 30.

The probes 16 and 17 are, as can be seen in FIG. 2, circumferentially spaced apart by a distance of such magnitude that at any one time, at least three rotor blades 14 are positioned between the probes 16 and 17. It will be understood, however, that the probes 16 and 17 could be angularly spaced apart by other distances, the important factor being that the probe 16 and 17 spacing is non-integral with the pitch of the tips 15 of the rotor blades 14, i.e. the probe spacing is not an integer multiple of the tip pitch. In the rotational position of the bladed rotor 12 shown in FIG. 2 the probe 17 is almost adjacent the rotor blade $b_4$ but the probe 16 is angularly spaced apart from the rotor blade $b_1$ by an angle of y°, the angle between adjacent rotor blades 14 being x°+y°.

Figure 5:
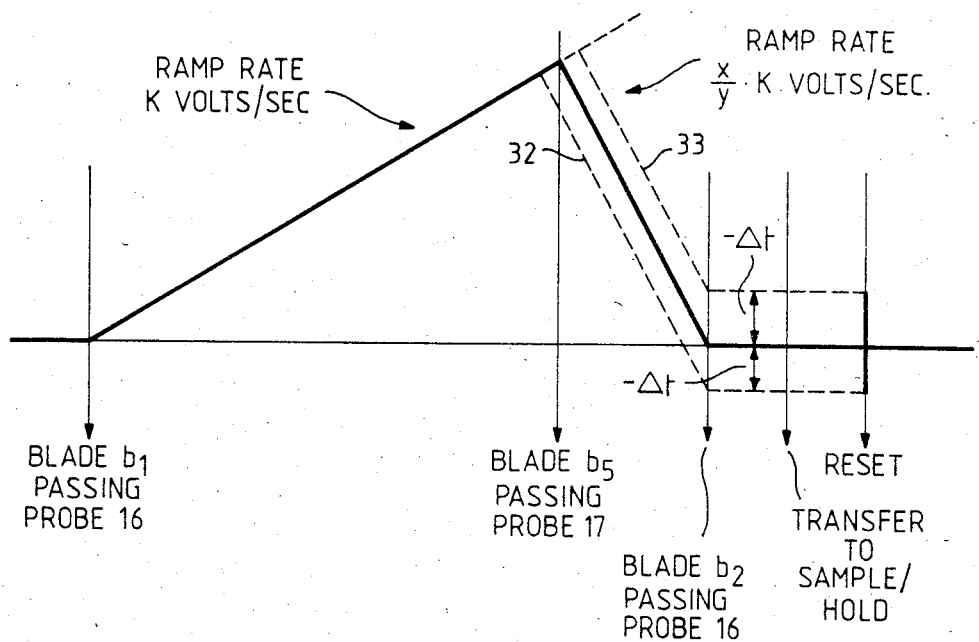
FIG. 5 is a diagram indicating the nature of the output of a ramp generator which is included in the circuit shown in FIG. 3.

As the bladed rotor 12 rotates in the direction indicated by the arrow 31, the rotor blade $b_1$ passes the probe 16 to produce a signal which is fed to the up-down ramp generator 29 to cause the ramp generator 29 to provide a steadily increasing voltage of K volts/second as can be seen from FIG. 5. This continues until the rotor blade $b_5$ passes the probe 17. The signal resulting from this encounter causes the ramp generator 29 to halt the steadily increasing voltage of K volts/second and replace it with a steadily decreasing voltage of x/y. K volts/second. This continues until rotor blade $b_2$ passes the probe 16 whereupon the signal resulting from this encounter causes the ramp generator 29 to halt the voltage decrease.

The angular spacing of the probes 16 and 17 and the ramp rates of the ramp generator 29 are selected such that if the spacings between the tips 15 of the rotor blades 14 are equal, the ramp generator 29 is at zero potential as the rotor blade $b_2$ passes the probe 16. Thus if the rotor blade tip 15 spacings are equal, there is no output from the ramp generator 29. However, if the blade tip 15 spacings are not equal, the tip 15 of the rotor blade $b_5$ will pass the probe 17 either earlier or later, thereby causing the ramp generator 29 to provide a steadily decreasing voltage as indicated by the interrupted lines 32 or 33 in FIG. 5. In each case, by the time the rotor blade $b_2$ passes the probe 16 and halts the steadily decreasing voltage of the ramp generator 29, there will be either a positive or negative voltage output from the ramp generator 29. The voltage output from the ramp generator 29, which is fed into the sample-hold circuit 30, is proportional to the time difference $\Delta t$ between the time interval relative to a point on the casing 11 between the rotor blades $b_5$ and $b_2$ had they been correctly spaced, and the actual time interval.

Vibration of the disc 13 causes the disc rim to adopt a generally sinuous configuration. This in turn results in the rotor blades 14 being displaced from the plane of rotation of the disc 13. Since the rotor blade tips 15 are acutely angled with respect to the plane of rotation of the disc 13, there is an effective change in the circumferential spacings of the blade tips 15 relative to the probes 16 and 17. It will be seen, therefore, that since the voltage output from ramp generator 29 is related to the blade tip 15 circumferential spacings, it will also be related to the vibration of the disc 13. This being so, if the rotational speed of the bladed rotor 12 is steadily increased until the disc reaches and passes through resonance, monitoring of the blade tip 15 spacings provides certain information regarding the nature of the disc 13 vibration at resonance. Moreover that information is provided even if the vibration results from tied order resonance, i.e. that which is tied to the rotational speed of the bladed rotor 12.

The output 34 from the sample-hold circuit 30 is fed to the Y axis of an X-Y recorder, the X axis being connected to the output 27 from the frequency -dc converter (which is proportional to the rotational speed of the bladed rotor 12). This enables a plot to be obtained of rotational speed against $\Delta t$.

The magnitude of the amplitude and frequency of vibration of the disc 13 is a function of the time $\Delta t$. This being so, it is possible to calculate these values from the obtained values of $\Delta t$.

It will be appreciated that the probes 16 and 17 and their associated circuitry will, in addition to monitoring changes in blade spacing which is due to vibration, will also detect variations in blade spacing which is due to manufacturing tolerances. However, since the divider 25 ensures that the same blade/probe combination is considered upon each revolution of the bladed rotor 12, any such manufacturing tolerances do not affect the obtained values of $\Delta t$.

Figure 7:
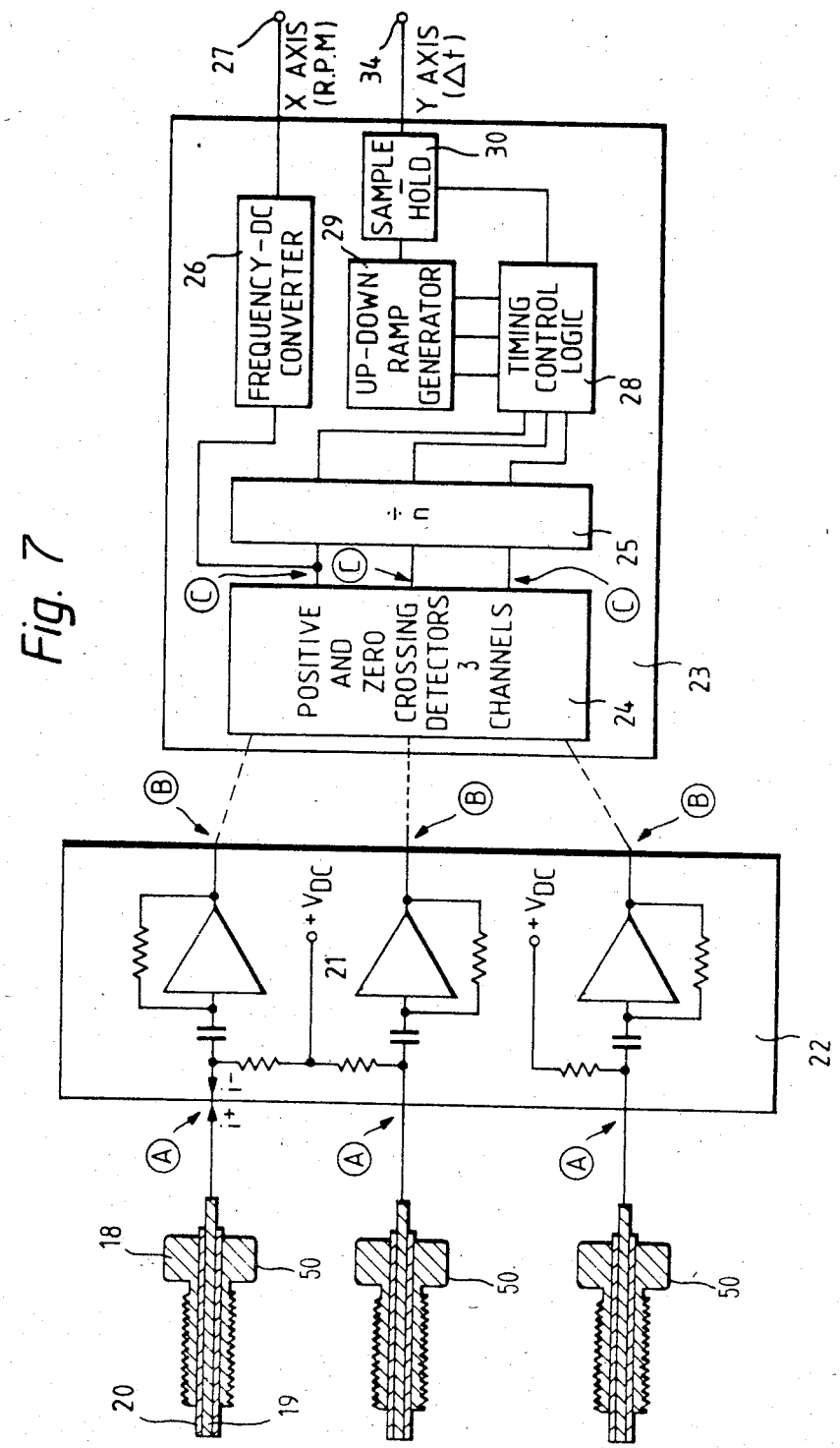
FIG. 7 is a diagram of a circuit and its associated probes for monitoring vibration in the rotor blades shown in FIGS. 1 and 2, which vibration may or may not be tied to rotation.

If it is desired to additionally investigate any vibration of the rotor blades 14 which may or may not be tied to rotation (as distinct from the above investigation of the disc as a whole), a third probe similar in construction to the probes 16 and 17 can be utilized. The three probes are arranged so as to have a known circumferential spacing within one pitch of the blade tips 15, e.g. as shown by dotted lines 50 in FIG. 2. They are linked to circuitry similar to that shown in FIG. 3, differing only in that the head amplifier is arranged so as to have three channels and that there are three threshold detectors 24 which are linked via the divider 25 and timing control logic 28 to the up-down ramp generator 29. Such a circuit is depicted in FIG. 7. The arrangement is such that the probes respectively produce signals by the passage of the same blade tip, which initiate the ramp generator 29, alter the sense of the originally rising generator voltage and finally stop the ramp generator 29. The output of the ramp generator 29 provides a $\Delta t$ signal in a manner similar to before. Since the $\Delta t$ signal is a function of the blade amplitude and frequency of vibration, then these can be calculated from the obtained values of $\Delta t$. Divider 25 may be omitted if $\Delta t$ signals are required from all the rotor blades 14. Storage means may be provided for storing a respective $\Delta t$ value for each blade.

Although the present invention has been described with reference to probes 16 and 17 which are of the capacitive type, it will be appreciated that alternative probe types could be utilized if desired. Thus, for instance, the probes could be optical or magnetic in nature and so arranged as to provide electrical pulses upon the passage of blade tips past them.

Figure 6:
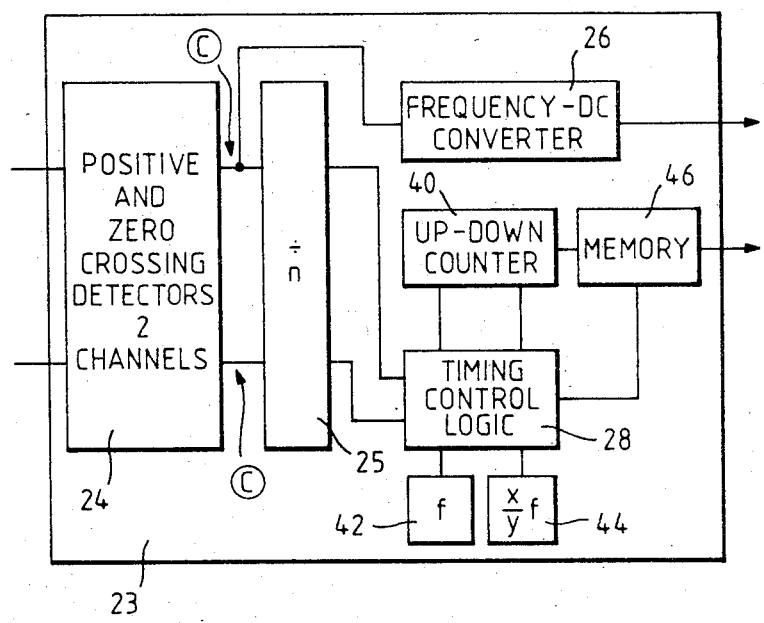
FIG. 6 is a diagram similar to part of FIG. 3, but showing an alternative vibration monitoring circuit.

The above-described circuitry is essentially of analogue form. However, FIG. 6 shows in broad outline a corresponding digital circuit. The ramp generator 29 is replaced by an up-down frequency counter 40. This is gated by the same signals used to start-reverse-stop the ramp generator and clocked by two frequency sources 42;44 of frequencies f and x/y.f. The count remaining at the end of each up-down cycle (Δt) (repeated every revolution of the rotor) is stored in a computer memory 46, which replaces the sample-hold circuit 30. Average rotor speed in r.p.m. during the counter up-down cycle is also measured using the blade passing frequency as before. Stored pairs of data, Δt vs. r.p.m. over an acceleration/deceleration of the rotor are then used with suitable algorithms to derive amplitude and frequency data.

I claim:

1. A rotary machine comprising:

a rotor;

a plurality of rotor elements circumferentially spaced around the rotor at generally equal spacings;

at least two probes mounted close to the path of portions of said elements which are subject to vibrational motion, the probes being circumferentially spaced from each other by a spacing which is non-integral with the spacing of the elements;

an electrical circuit connected to receive the outputs of the probes, and comprising:

first means providing an output which can change progressively in either of two opposite senses at predetermined rates;

triggering means for causing the output of said first means to commence changing in a first said sense on passage of a said element portion past a first said probe, and subsequently to commence changing in the second said sense on passage of a said element portion past a second said probe; and output means, which registers the output of the first means on passage of a said element portion past one of the probes, whereby the output from the output means is indicative of vibration of said element portions.

2. A rotary machine as claimed in claim 1 wherein said electrical circuit incorporates divider means so arranged that said progressively changing output means is triggered only by signals emanating from a group of three of said rotor elements for each revolution of said rotor.

3. A rotary machine as claimed in claim 1 wherein said electrical circuit incorporates means to provide an electrical output which is proportional to the rotary speed of said rotor.

4. A rotary machine as claimed in claim 1 wherein said machine includes a third said probe, and said triggering means causes the output means to register the output of the first means on passage of said element portion past the third probe.

5. A rotary machine as claimed in claim 1 wherein each of said probes is of the capacitive type.

6. A rotary machine as claimed in claim 1 wherein said rotary machine is the compressor or turbine of a gas turbine engine and said rotor elements are radially extending aerofoil blades.

7. A rotary machine as claimed in claim 1 wherein said first means comprises an up-down ramp generator.

8. A rotary machine as claimed in claim 1 wherein said first means comprises an up-down frequency counter.

* * * * *